United States Patent [19]

Hayama et al.

[11] Patent Number: 5,102,488
[45] Date of Patent: Apr. 7, 1992

[54] PROCESS FOR FORMING CURED-RESIN LAYER HAVING AN ANTISTATIC SURFACE

[75] Inventors: Kazuhide Hayama; Noritaka Hosokawa; Takao Yazaki; Masataka Noro, all of Yokkaichi, Japan

[73] Assignee: Mitsubishi Petrochemical Co., Ltd., Tokyo, Japan

[21] Appl. No.: 591,377

[22] Filed: Oct. 1, 1990

[30] Foreign Application Priority Data

Oct. 3, 1989 [JP] Japan .................................. 1-257107

[51] Int. Cl.⁵ ...................... B32B 31/12; B32B 31/28; B29C 65/14
[52] U.S. Cl. .................. 156/275.5; 156/344; 264/22; 264/236; 264/334; 264/331.18; 264/347; 427/54.1; 430/528; 430/529
[58] Field of Search ................. 264/22, 129, 130, 134, 264/236, 347, 334, 331.18; 252/500; 156/272.2, 273.3, 275.5, 344; 427/44, 54.1; 430/530, 529, 528, 527; 204/157.87

[56] References Cited

U.S. PATENT DOCUMENTS

| | | | |
|---|---|---|---|
| 3,764,370 | 10/1973 | Bragole | 427/54.1 |
| 4,105,806 | 8/1978 | Watt | 427/44 |
| 4,221,861 | 9/1980 | Norman et al. | 430/529 |
| 4,421,782 | 12/1983 | Bolgiano et al. | 264/22 |
| 4,495,276 | 1/1985 | Takimoto et al. | 430/530 |
| 4,582,781 | 4/1986 | Chen et al. | 430/530 |
| 4,610,955 | 9/1986 | Chen et al. | 430/530 |
| 4,957,947 | 9/1990 | Chen et al. | 430/530 |
| 4,981,746 | 1/1991 | Matsuo et al. | 156/60 |

FOREIGN PATENT DOCUMENTS 609525 11/1960 Canada .............................. 156/272.2

Primary Examiner—Jeffery Thurlow
Assistant Examiner—Mathieu Vargot
Attorney, Agent, or Firm—Oblon, Spivak, McClelland, Maier & Neustadt

[57] ABSTRACT

The present invention provides a method for forming a cured-resin layer having a surface with antistatic properties. An ultraviolet-curable resin having antistatic properties is laminated on an ultraviolet-curable resin for forming an electrostatic cured surface by curing and the two layers then being simultaneously cured by ultraviolet irradiation thereon. A cured-resin layer is thereby obtained where the surface layer of the cured resin is provided with antistatic properties, and is strongly held by chemical bonding.

3 Claims, No Drawings

PROCESS FOR FORMING CURED-RESIN LAYER HAVING AN ANTISTATIC SURFACE

BACKGROUND OF THE INVENTION

1. Field of the Invention

The present invention relates to a method for forming a cured-resin layer having an antistatic surface. More specifically, the present invention relates to a method for forming an ultraviolet-cured resin layer having excellent antistatic properties, suitable for use in coating, printing, cast articles, and electronic parts.

2. Discussion of the Background

Ultraviolet-curable resins have been widely used for coating, printing, cast articles, electronic parts and the like, by employing the characteristic properties thereof such that the resin layer can be rapidly cured at normal temperatures by ultraviolet irradiation, in a high solid fractions or without solvents, as is described in "New Polymer Series", Shin Ko-bunshi Bunko, No. 21, Handbook to UV Curing Technology, Polymer Kanko-kai ed.

However, the cured layers derived from ordinary ultraviolet-curable resins have serious defects in that the specific surface resistance thereof is so high that static electricity is easily accumulated thereon. The accumulation of static electricity causes not only deposition of dust thereon to dirty the appearance of products but also damages on the products due to rubbing and abrasion. In order to overcome these defects, there has been proposed the use of a combination of ordinary ultraviolet-curable resins and ultraviolet-curable resins provided with antistatic properties (Japanese Patent Publication Nos. 14859/1974 and 22952/1974). Nevertheless, only the antistatic ultraviolet-curable resin present on the surface exhibits the antistatic effect, so that any antistatic agent present except for that on the surface layer may totally be useless, according to such a method. Accordingly, in order to achieve this objective, a large amount of an ultraviolet-curable resin having antistatic properties is required not only leading to an increase in production costs therefor but also as a result of the contamination by other components which are not necessarily required inside the curing resin layer, there has been the problem of some deterioration in the properties that have been sought in the ultraviolet-curable resins.

If attention is only focused on the problem of the antistatic effect being limited to the surface layer, an antistatic ultraviolet-curable resin may be applied on an ordinary ultraviolet-curable resin layer treated with ultraviolet curing, and then cured by ultraviolet irradiation again. However, the surface layer of the antistatic ultraviolet-cured resin according to the above method may be readily peeled off so that the antistatic effect may be exhibited only temporarily.

SUMMARY OF THE INVENTION

It has been found that an antistatic cured resin with excellent durability may be formed by laminating an antistatic ultraviolet-curable resin layer on an ordinary ultraviolet-curable resin and irradiating the layer with ultraviolet rays to form an antistatic layer only on the surface, without damaging the properties that the ultraviolet-cured resin should have, while forming chemical bonding between the antistatic ultraviolet-curable resin layer and the ordinary ultraviolet-curable resin layer, to achieve the present invention.

The present invention is to provide a method for forming a cured resin layer having an antistatic surface, comprising laminating an ultraviolet-curable resin having antistatic properties on an ultraviolet-curable resin for forming an electrostatic cured surface through curing and then simultaneously curing the two layers by ultraviolet irradiation thereon.

DETAILED DESCRIPTION OF THE INVENTION

The present invention will now be explained in detail hereinafter.

Ultraviolet-curable resin for forming an electrostatic cured surface through curing By the term ultraviolet-curable resin for forming an electrostatic cured surface through curing as used in the present invention is meant an ultraviolet-curable resin which is not specifically provided with antistatic properties, and which is not to be defined on the basis of its degree of electrostatic properties. For such ultraviolet-curable resin, there may be used any one from the following series; an unsaturated polyester resin to be cured by vinyl polymerization: monomer, oligomer or polymer of styrene, a methacryl or acryl series (referred to as (meth)acryl series hereinafter); a polythiol(resin containing mercapto groups) and polyene (allyl unsaturated resin) to be cured by addition polymerization; and an epoxy resin and epoxy diluent to be cured by cationic polymerization. Among them, acrylic monomers, oligomers and polymers containing at least one or more acryloyl groups are preferable because of their short curing period, the wide variety of materials available, and fewer obstacles to atmospheric curing.

The acrylic monomer containing at least one or more acryloyl groups within a molecule, as is described in "UV EB Curing Handbook", Material Series (Polymer Kanko-Kai ed.), includes monofunctional acrylates such as tetrahydrofurfuryl acrylate, cyclohexyl acrylate, benzyl acrylate, methoxyethyl acrylate, ethoxyethyl acrylate, butoxyethyl acrylate, phenoxyethyl acrylate, dicyclopentenyl acrylate, dicyclopentenyloxyethyl acrylate, dicyclopantenyl acrylate; and multifunctional acrylates such as 1,4-butanediol diacrylate, neopentyl glycol diacrylate, 1,6-hexanediol diacrylate, tricyclodecanedimethanol diacrylate, trimetylolpropane triacrylate, trimethylolpropane tetraacrylate, tris-(acryloxyethyl) isocyanurate, pentaerythritol triacrylate, pentaerythritol tetraacrylate, dipentaerythritol pentaacrylate, dipentaerythritol hexaacrylate.

The acrylic oligomer containing at least one or more acryloyl groups within a molecule includes, epoxy acrylates such as adducts of acrylic acid to bisphenol-A type epoxy resin, adducts of acrylic acid to novolak-type epoxy resin and the like, urethane acrylate obtained by adding an acrylic acid ester containing hydroxyl group, such as hydroxyethyl acrylate, hydroxypropyl acrylate, pentaerythritol triacrylate, dipentaerythritol pentaacrylate and the like, to an isocyanate prepolymer obtained by reacting a polyisocyanate such as tolylene diisocyanate, isophorone diisocyanate, hexamethylene diisocyanate and the like, with a polyol such as polypropylene glycol, polytetramethylene glycolol, condensation polymerization products of adipic acid and ethylene glycol.

The acrylic polymer containing at least one or more acryloyl groups within a molecule includes compounds containing acryloyl groups at side chains of (meth)acrylic acid ester copolymer such as adducts of acrylic acid to copolymers including glycidyl (meth)acrylate, adducts of glycidyl acrylate to copolymers containing (meth)acrylic acid, addition products of polyisocyanurate and acrylic acid estercontaining a hydroxyl group to copolymers including (meth)acrylic acid esters containing a hydroxyl group and the like; adducts of acrylic acid ester containing hydroxyl group to copolymer of styrene and maleic anhydride, addition polymer of acrylic monomer containing three or more acryloyl groups and piperazine.

Furthermore, a mixture of 2 or more of these acrylic monomers, oligomers and polymers may also be used.

Ultraviolet-curable resin having antistatic properties

The ultraviolet-curable resin having antistatic properties to be used in the present invention may principally comprise compounds containing, within a molecule, at least one or more of each of the groups having antistatic properties and an acryloyl group.

The group having antistatic properties includes for example nonionic polyoxyethylene groups, anionic carboxylate, cationic quarternary ammonium salts and the like.

The compounds containing at least one or more of each of the nonionic polyoxyethylene groups having antistatic properties and acryloyl groups may include for example polyethylene glycol monoacrylate, adducts of acrylic acid to copolymer containing polyethylene glycol mono(meth)acrylate and glycidyl (meth)acrylate, adducts of glycidyl acrylate to copolymer containing polyethylene glycol mono(meth)acrylate and (meth)acrylic acid, adducts of addition products of polyisocyanate and acrylic acid ester containing hydroxyl group to copolymer containing polyethylene glycol mono(meth)acrylate and (meth)acrylic acid ester containing hydroxyl group.

The compounds containing at least one or more of each of anionic carboxylate and an acryloyl group may include for example compounds which are produced by reacting a part of carboxylic acid in the (meth)acrylic acid ester copolymer containing (meth)acrylic acid as one of its copolymer components with glycidyl acrylate, or acrylic acid ester containing hydroxyl group, or a halogenated acrylic acid ester (chloromethyl acrylate, chloroethyl acrylate, bromobutyl acrylate and the like) and neutralizing the whole or a part of the remaining carboxyl group with a base (sodium hydroxide, potassium hydroxide, ammonia and the like); and compounds which are produced by reacting a part of the acid anhydride of the copolymer of styrene and maleic anhydride with an acrylic acid ester containing hydroxyl group, and neutralizing the whole or a part of the remaining carboxyl group with a base.

The compounds containing at least one or more of each of the quarternary ammonium salts and an acryloyl group may include for example compounds which are produced by reacting an acid (hydrochloric acid, phosphoric acid, formic acid, acetic acid and the like) and a compound containing epoxy group (glycidyl (meth)acrylate, allylglycidyl ether, 2-ethylhexylglycidyl ether, phenylglycidyl ether and the like), or a compound containing halogens in covalent bonding (methyl chloride, ethyl chloride, allyl chloride, chloromethyl styrene, chloromethyl (meth)acrylate, chloroethyl (meth)acrylate, bromobutyl (meth)acrylate, 3-chloro-2-hydroxypropyl (meth)acrylate and the like), with acrylic acid ester containing tertiary nitrogen (N,N-dimethylaminoethyl acrylate, N,N-diethylaminoethyl acrylate, addition polymer of an acrylic monomer containing three or more acryloyl groups and piperazine); and compounds which are produced by reacting an acid and glycidyl acrylate, or a halogenated acrylic acid ester with compounds containing tertiary nitrogen (copolymers containing polymerizable monomers containing tertiary nitrogen, such as N,N-dimethylaminoethyl (meth)acrylate, N,N-diethylaminoethyl (meth)acrylate, N,N-dimethylaminoethyl (meth)acrylamide, N,N-dimethylaminopropyl (meth)acrylamide, N,N-diethylaminoethyl (meth)acrylamide, N,N-diethylaminopropyl (meth)acrylamide, N,N-dimethylaminomethyl styrene and the like, and trimethylamine, triethylamine, triethanolamine, the polymerizable monomers containing tertiary nitrogen described above, and the like].

Photopolymerization initiator and other additives

The ultraviolet-curable resin for forming an electrostatic cured surface through curing, and the ultraviolet-curable resin having antistatic properties, according to the present invention, are then used after addition of a photopolymerization initiator. The photopolymerization initiator may include benzoin methyl ether, benzoin ethyl ether, benzoin isopropyl ether, benzoin butyl ether, diethoxyacetophenone, benzyldimethyl ketal, 2-hydroxy-2-methyl propiophenone, 1-hydroxycyclohexyl phenylketone, benzophenone, Michler's ketone, N,N-dimethylaminobenzoic acid isoamyl, 2-chlorothioxanthone, 2,4-diethylthioxanthone and the like, and these photopolymerization initiators may be used in appropriate combination thereof. The amount of photopolymerization initiator to be used is 0.1–10, preferably 1–5 parts by weight per 100 parts by weight of each of the ultraviolet-curable resins.

To the ultraviolet-curable resin for forming an electrostatic cured surface through curing and the ultraviolet-curable resin having antistatic properties, according to the present invention, may be also added, if necessary, for example solvents (for example, water, alcohols including methanol, ethanol, n-propanol, isopropanol, n-butanol, sec-butanol, diacetone alcohol, methyl cellosolve, ethylcellosolve, butyl cellosolve, butylcarbitol and the like, ethers including dioxane, tetrahydrofuran and the like, ketones including acetone, methylethyl ketone and the like, esters including cellosolve acetate and the like, aromatics including benzene, toluene, xylene and the like) for the purpose of adjusting the viscosity thereof. In order to inhibit the heat polymerization during storage, inhibitors of heat polymerization (for example, hydroquinone, hydroquinone monomethyl ether, catechol, p-t-butylcatechol, phenothiazine and the like) may be also added. In order to improve film properties, ultraviolet absorbers (for example, benzotriazole ultraviolet absorber), ultraviolet stabilizers (for example, hindered amine ultraviolet stabilizer), antioxidants (for example, hindered phenol antioxidant) may be added as well; in order to improve film properties, there may be also added various additives which can be compounded with such types of ultraviolet-curable resins, such as thermoplastic resins solubilizable in the present ultraviolet-curable resins (for example, polyurethane resins, polyester resins, acryl resins, vinyl chloride resins and the like), blocking-inhibiting agents, slip agents, levelling agents.

Lamination

The ultraviolet-curable resin for forming an electrostatic cured surface through curing to be used in the present invention may be coated on a film or sheet of polyethylene, polypropylene, methacryl resin, polycarbonate resin, polyester resin, vinyl chloride resin, polyurethane resin and the like, aluminum foil, steel plate, paper and the like, in the thickness of 1–50μ, the thickness varying depending on the purpose of the coating. On the ultraviolet-curable resin for forming an electrostatic cured surface through curing, may be coated or decalcomania-transferred the ultraviolet-curable resin having antistatic properties in the thickness of 0.01–5μ, for lamination. The decalcomania-transfer thereof, in particular, may be carried out by employing and laminating the ultraviolet-curable resin layer having antistatic properties, which has been coated on a transparent film having a 10–200μ thickness and being capable of transmitting ultraviolet light, such as polyethylene, polypropylene, polyester, polycarbonate and the like.

In cases where a film after curing is not easily peeled off, a film coated with a mold remover, such as silicone resin or fluorine resin may be used.

An ultraviolet-curable resin composition of film-forming and antistatic properties may be coated on a film by means of industrial coating machines capable of uniform and smooth coating, such as an air-knife coater, blade coater, bar coater, gravure coater, curtain coater, roll coater and the like. After coating, solvents are then eliminated by heating to dryness. The thickness of the ultraviolet-curable resin composition to be formed on the film surface, after drying, may preferably be 0.01–5μ.

In the cases where the decalcomania-transfer technique is used, the two layers thereof may be simultaneously cured by ultraviolet irradiation from the back of the coated film of the laminated product thus obtained by the above method, using a lamp such as a xenon lamp, a low-pressure mercury lamp, a high-pressure mercury lamp, a metal-halide lamp, a carbon arc lamp, a tungsten lamp and the like, to form chemical bonding between the two layers producing an ultraviolet-cured resin having an antistatic layer with excellent durability.

EXAMPLES

Methods of the present invention are illustrated with reference to the following examples, but the invention is not intended to be limited only to these following examples. Parts or % in the following examples are based on weight unless expressed to the contrary.

EXAMPLE 1

To 90 parts of methyl methacrylate, 10 parts of glycidyl methacrylate and 105 parts of toluene was added 0.3 part of azobisisobutyronitrile, and a polymerization reaction at 80° C. was carried out for 6 hours. After the temperature of the mixture was raised to 110° C., 5 parts of acrylic acid, 0.5 part of tetramethylammonium bromide, and 0.05 part of hydroquinone monomethyl ether were added to and reacted with the mixture at 110° C. for 6 hours, producing a 50% toluene solution of methacrylic acid ester copolymer having an acryloyl group at the side chain thereof. Into 100 parts of the solution 25 parts of dipentaerythritol hexaacrylate, 75 parts of toluene and 2 parts of benzyl dimethyl ketal were dissolved and mixed to obtain an ultraviolet-curable resin (1).

One hundred (100) parts of styrene-maleic anhydride copolymer (0.5 mole as maleic anhydride), 38.7 parts (0.33 mole) of hydroxyethyl acrylate, 0.4 part of 2-methylimidazole and 150 parts of methyl isobutyl ketone were reacted together at 110° C. for 4 hours. The resulting mixture was water-cooled, to which 37.3 parts (0.67 mole) of potassium hydroxide dissolved in 250 parts of water was added dropwise, to react at 40° C., for 3 hours. While adding 150 parts of water at 60° C. under reduced pressure, 150 parts of the methyl isobutyl ketone were distilled off, followed by addition of 3 parts of benzyl dimethyl ketal, which was then diluted to 10% using water/isopropoyl alcohol (weight ratio of 1/1) to obtain an ultraviolet-curable resin (A) having antistatic properties.

The ultraviolet-curable resin (1) was applied to a polypropylene sheet treated with corona discharge, by means of a bar coater to obtain a film thickness of 10μ, which was subsequently heated and dried at 80° C. for 2 minutes. On the ultraviolet-curable resin layer was coated the ultraviolet-curable resin (A) by means of a bar coater, to obtain a film thickness of 0.1μ, which was then heated and dried at 80° C. for 2 minutes to laminate two types of the ultraviolet-curable resins.

By irradiating ultraviolet light on the laminated ultraviolet-curable resin layer under conditions of a conveyer speed of 2 m/min at 9 cm below a light source, and using an irradiation apparatus having a high-pressure mercury vapor light of 2 kw power and 80 w/cm power density, arranged vertically to the direction of the pass of a sample, the two layers of the ultraviolet-curable resins in lamination were cured simultaneously.

The specific surface resistance [Ω/cm] of the cured film thus obtained was $3.8 \times 10^{10}$ Ω/cm when measured at 25° C. and 60% R.H., indicating that an ultraviolet-curable resin layer of excellent antistatic properties was obtained. After one-day immersion in water and acetone, the layer was measured for specific surface resistance, which was $7.1 \times 10^{10}$ Ω/cm and $5.3 \times 10^{10}$ Ω/cm, respectively, indicating that almost no deterioration was observed.

The specific surface resistance of a cured film without an antistatic layer, which was obtained by coating and drying the ultraviolet-curable resin (1) on a polypropylene sheet at a thickness of 10μ, and irradiating ultraviolet light in the same conditions as described above, was $5.1 \times 10^{15}$ Ω/cm.

EXAMPLE 2

Ten (10) parts of polyethylene glycol monoacrylate (132 mg KOH/g.hydroxyl value), 0.3 part of benzyl dimethyl ketal were dissolved and mixed in 90 parts of methyl ethyl ketone to obtain an ultraviolet-curable resin having antistatic properties (B).

The ultraviolet-curable resin (1) obtained in EXAMPLE 1 was coated on a methacryl board to obtain a film thickness of 10μ after drying, by using a bar coater, and heated and dried at 80° C. for 2 minutes. On the ultraviolet-curable resin layer was coated the antistatic ultraviolet-curable resin (B) by means of a bar coater, to obtain film thickness of 0.1μ after drying, which was then heated and dried at 80° C. for 2 minutes to laminate the two ultraviolet-curable resins. By irradiating ultraviolet light on the laminated ultraviolet-curable resins in the same manner as in EXAMPLE 1, the two layers of the ultraviolet-curable resins were cured simultaneously.

The specific surface resistance [Ω/cm] of the cured film thus obtained was measured at 25° C. and 60% R.H., as in EXAMPLE 1, and the results are shown below:
Specific surface resistance; $5.1 \times 10^{10}$ Ω/cm
Specific surface resistance after one-day immersion in water; $8.6 \times 10^{10}$ Ω/cm
Specific surface resistance after one-day immersion in acetone; $7.6 \times 10^{10}$ Ω/cm

COMPARATIVE EXAMPLE 1

A mixture of 95 parts of the ultraviolet-curable resin (1) obtained in EXAMPLE 1 and 5 parts of the polyethylene glycol monoacrylate (132 mg KOH/g.hydroxyl value) used in EXAMPLE 2, was coated on a methacryl board to obtain a film thickness of 10μ after drying, by using a bar coater, and heated and dried at 80° C. for 2 minutes, followed by curing by ultraviolet irradiation in the same manner as in EXAMPLE 1.

The specific surface resistance [Ω/cm] of the product at 25° C. and 60% R.H., was $2.3 \times 10^{12}$ Ω/cm, which indicates that the antistatic properties of the product were much poorer than the product of EXAMPLE 2, although the amount of polyethylene glycol monoacrylate used was about 12 fold that in EXAMPLE 2.

Specific surface resistance after one-day immersion in water and acetone was $4.5 \times 10^{12}$ Ω/cm and $5.1 \times 10^{12}$ Ω/cm, respectively, indicating that almost no deterioration due to the immersion was observed.

COMPARATIVE EXAMPLE 2

The ultraviolet-curable resin (1) obtained in EXAMPLE 1 was coated on a methacryl board to obtain a film thickness of 10μ after drying, by using a bar coater, and heated and dried at 80° C. for 2 minutes, followed by treatment with ultraviolet irradiation to obtain an ultraviolet-cured resin layer. On the cured layer was coated the antistatic ultraviolet-curable resin (B) obtained in EXAMPLE 2 to obtain a film thickness of 0.1μ after drying, by using a bar coater, and heated and dried at 80° C. for 2 minutes, followed by additional treatment with ultraviolet irradiation to obtain an ultraviolet-cured resin layer composed of two layers.

The specific surface resistance [Ω/cm] of the product at 25° C. and 60% R.H., was $5.7 \times 10^{10}$ Ω/cm, almost similar to that in EXAMPLE 2; while specific surface resistance after one-day immersion in water and acetone was $3.5 \times 10^{14}$ Ω/cm and $7.6 \times 10^{14}$ Ω/cm, respectively, indicating that the antistatic ultraviolet-cured resin layer on the surface was easily scaled off.

EXAMPLE 3

To 73 parts of diglycidyl ether of bisphenol A and 27 parts of acrylic acid was added 0.3 part of tetramethylammonium bromide and reacted at 110° C. for 5 hours to obtain epoxy acrylate. In 100 parts of the epoxy acrylate were dissolved and mixed 20 parts of tricyclodecane dimethanol diacrylate and 3 parts of benzyl dimethyl ketal, to obtain an ultraviolet-curable resin (2).

The ultraviolet-curable resin (2) was coated on a polycarbonate board using a bar coater, to obtain a film thickness of 10μ. The ultraviolet-curable resin (A) was coated on a transparent polypropylene film of 20μ thickness, to obtain a film thickness of the ultraviolet-curable resin (A) after drying of 0.05μ, by using a bar coater, and heated and dried at 80° C. for 2 minutes. After the resulting film was laminated on the ultraviolet-curable resin layer described above, the two layers composed of the ultraviolet-curable resins were simultaneously cured on ultraviolet irradiation from the back of the film.

The specific surface resistance [Ω/cm] of the cured film obtained by scaling off the polypropylene film was measured at 25° C. and 60% R.H., as in EXAMPLE 1, and the results are shown below:
Specific surface resistance; $4.5 \times 10^{10}$ Ω/cm
Specific surface resistance after one-day immersion in water; $8.3 \times 10^{10}$ Ω/cm
Specific surface resistance after one-day immersion in acetone; $6.0 \times 10^{10}$ Ω/cm The specific surface resistance of the cured film without an antistatic layer, which was obtained by coating the ultraviolet-curable resin (2) on a polycarbonate board to obtain a film thickness of 10μ, and curing the film by ultraviolet irradiation, was $2.9 \times 10^{15}$ Ω/cm.

EXAMPLE 4

Fifty (50) parts of dipentaerythritol hexaacrylate, 50 parts of dipentaerythritol pentaacrylate and 3 parts of benzyl dimethyl ketal were dissolved and mixed to obtain an ultraviolet-curable resin (3).

To 80 parts (0.51 mole) of N,N-dimethylaminoethyl methacrylate, 10 parts of methyl methacrylate, 10 parts of cyclohexyl methacrylate, and 100 parts of isopropyl alcohol was added 0.5 part of azobisisobutyronitrile, to effect a polymerization reaction at 80° C. for 6 hours. To the resulting mixture, after water-cooling, 15.5 parts (0.15 mole) of 36% hydrochloric acid and 126 parts of water, and then 21.7 parts (0.15 mole) of glycidyl acrylate at 70° C. were added dropwise, to react together for 6 hours, to which were added 4 parts of benzyl dimethyl ketal. The resulting solution was diluted to 10% with water/isopropyl alcohol (1:1 weight ratio) to obtain an ultraviolet-curable resin (C) having antistatic properties.

The ultraviolet-curable resin (3) was applied to a polypropylene sheet treated with corona discharge, by means of a bar coater, to obtain a film thickness of 10μ, which was subsequently heated and dried at 80° C. for 2 minutes. On a polypropylene film of a 20μ thickness was coated the ultraviolet-curable resin (C) by means of a bar coater, to obtain a film thickness of 0.2μ, which was then heated and dried at 80° C. for 2 minutes. After the resulting film was laminated on the ultraviolet-curable resin layer described above, the two layers composed of the ultraviolet-curable resins were simultaneously cured on ultraviolet irradiation from the back of the film.

The specific surface resistance [Ω/cm] of the cured film obtained by scaling off the polypropylene film was measured at 25° C. and 60% R.H., as in EXAMPLE 1, and the results are shown in the following:
Specific surface resistance; $8.5 \times 10^9$ Ω/cm
Specific surface resistance after one-day immersion in water; $1.8 \times 10^{10}$ Ω/cm
Specific surface resistance after one-day immersion in acetone; $9.4 \times 10^9$ Ω/cm The specific surface resistance of the cured film without an antistatic layer, which was obtained by coating the ultraviolet-curable resin (3) on a polypropylene sheet to obtain a film thickness 10, and curing the film by ultraviolet irradiation, was $3.0 \times 10^{16}$ Ω/cm.

The present invention, as is thus constituted, may provide a cured resin layer provided with antistatic properties only on the surface of the cured resin, the properties being maintained on the surface by the strong chemical bonding.

What is claimed is:

1. In a method for forming a cured-resin having an antistatic surface, the improvement comprising:

laminating a layer of an ultraviolet-curable resin having antistatic properties on a layer of an ultraviolet-curable resin for forming an electrostatic cured surface; said ultraviolet-curable resin having antistatic properties comprising a compound containing, within a molecule, at least one or more of each of (1) a group having antistatic effects selected from the group consisting of nonionic polyoxyethylene group, anionic carboxylate group and cationic quaternary ammonium salt group and (2) an acryloyl group; said ultraviolet-curable resin for forming an electrostatic cured surface comprising a compound containing, within a molecule, one or more acryloyl groups; and then, simultaneously, curing the two layers by ultraviolet irradiation thereon to thereby chemically bond the two layers together.

2. The method according to claim 1, wherein the uncured ultraviolet-curable resin for forming the electrostatic cured surface comprises an acrylic monomer, an acrylic oligomer, an acrylic polymer, or a mixture thereof.

3. The method according to claim 1, further comprising laminating the ultraviolet-curable resin layer having antistatic properties coated on a transparent film onto the ultraviolet-curable resin for forming an electrostatic cured surface, curing the two layers simultaneously by ultraviolet irradiation thereon and subsequently peeling off the film.

* * * * *